(12) United States Patent
Paganini et al.

(10) Patent No.: US 6,168,197 B1
(45) Date of Patent: Jan. 2, 2001

(54) AIRBAG DEPLOYMENT DEVICE AND CONTROL

(75) Inventors: Lisa M. Paganini, Fenton; Gary F. Kajdasz, Commerce Township; Ernest P. Minissale, Novi; Joseph G. Machak, Oakland Township, all of MI (US)

(73) Assignee: DaimlerChrysler Corporation, Auburn Hills, MI (US)

( * ) Notice: Under 35 U.S.C. 154(b), the term of this patent shall be extended for 0 days.

(21) Appl. No.: 09/289,780

(22) Filed: Apr. 9, 1999

(51) Int. Cl.$^7$ .................................................... B60R 21/32
(52) U.S. Cl. .............................. 280/735; 180/271; 701/45
(58) Field of Search .................................. 280/734, 735; 180/271; 701/45, 46; 340/436; 307/10.1

(56) References Cited

U.S. PATENT DOCUMENTS

| | | |
|---|---|---|
| 3,724,870 | 4/1973 | Kurokawa et al. . |
| 3,758,131 | 9/1973 | Stephenson et al. . |
| 3,773,353 | 11/1973 | Trowbridge et al. . |
| 3,966,224 | 6/1976 | Campbell et al. . |
| 3,972,545 | 8/1976 | Kirchoff et al. . |
| 5,158,323 | 10/1992 | Yamamoto et al. . |
| 5,166,880 * | 11/1992 | Furui ........................ 701/45 |
| 5,178,409 | 1/1993 | Hiramitsu et al. . |
| 5,221,109 | 6/1993 | Marchant . |
| 5,320,382 | 6/1994 | Goldstein et al. . |
| 5,330,226 | 7/1994 | Gentry et al. . |
| 5,368,329 | 11/1994 | Hock . |
| 5,400,487 | 3/1995 | Gioutsos et al. . |
| 5,409,258 * | 4/1995 | Kawabata .............................. 340/436 |
| 5,413,378 | 5/1995 | Steffens, Jr. et al. . |
| 5,430,649 * | 7/1995 | Cashier et al. ........................... 701/46 |
| 5,460,405 | 10/1995 | Faigle et al. . |
| 5,515,027 * | 5/1996 | Billig et al. ........................... 280/734 |
| 5,531,472 | 7/1996 | Semchena et al. . |
| 5,558,367 | 9/1996 | Cuevas . |
| 5,564,743 | 10/1996 | Marchant . |
| 5,590,904 | 1/1997 | Ellis et al. . |
| 5,621,326 * | 4/1997 | Watanabe et al. .................... 280/735 |
| 5,626,359 | 5/1997 | Steffens, Jr. et al. . |
| 5,659,474 * | 8/1997 | Maeno et al. ......................... 280/735 |
| 5,732,375 | 3/1998 | Cashler . |
| 5,746,444 | 5/1998 | Foo et al. . |
| 5,758,301 * | 5/1998 | Saito et al. ........................... 280/735 |
| 5,758,899 | 6/1998 | Foo et al. . |
| 5,785,347 | 7/1998 | Adolph et al. . |
| 5,787,377 * | 7/1998 | Watanabe et al. .................... 280/735 |
| 5,802,480 * | 9/1998 | Shiraishi .............................. 280/735 |
| 5,806,008 | 9/1998 | Takeuchi . |
| 5,809,439 * | 9/1998 | Damisch .............................. 280/735 |
| 5,825,098 | 10/1998 | Darby et al. . |
| 5,831,342 | 11/1998 | Vivacqua et al. . |
| 5,872,460 * | 2/1999 | Bennett et al. ....................... 280/735 |
| 5,880,534 * | 3/1999 | Mossi et al. .......................... 280/735 |
| 5,914,653 * | 6/1999 | Takeuchi et al. ..................... 280/734 |
| 5,961,562 * | 10/1999 | Iyoda ................................... 280/735 |
| 5,964,817 * | 10/1999 | Dalum et al. ........................ 340/436 |
| 6,036,225 * | 3/2000 | Foo et al. ............................... 701/45 |

* cited by examiner

*Primary Examiner*—J. J. Swann
*Assistant Examiner*—Christopher D Bottorff
(74) *Attorney, Agent, or Firm*—Roland A. Fuller, III (57) ABSTRACT

A method for controlling an airbag system is provided. The airbag system includes an airbag module which may be deployed at different rates to optimize performance of the airbag module to a given impact. The airbag system includes a control module, an impact sensor, a seatbelt restraint sensor and an airbag module. The airbag module includes an inflator having two independent squibs, a first one of the squibs being coupled to a first charge and a second one of the squibs being coupled to a second charge. The method monitors various vehicle dynamics and controls the generation of first and second squib pulses which cause the deployment of the first and second charges so as to optimize the rate at which the airbag is deployed for an impact of a given magnitude. The method also monitors the integrity of each squib circuit and when a fault in a squib circuit is detected, the deployment algorithm is modified to ensure that the airbag will deploy.

20 Claims, 4 Drawing Sheets

AIRBAG DEPLOYMENT DEVICE AND CONTROL

BACKGROUND OF THE INVENTION

1. Technical Field

The present invention relates generally to occupant restraint systems and more particularly to a method for controlling the deployment of an airbag.

2. Discussion

Modern airbag systems generally include an airbag control module (ACM) and one or more single-stage airbag modules. The ACM typically includes software and hardware to diagnose the airbag system, one or more accelerometers to sense acceleration or deceleration, and a software algorithm to ascertain the severity of an impact and decide whether or not to deploy an airbag module.

Generally, when an airbag module is deployed, the ACM generates an electrical signal through the vehicle wire harness to a squib which causes the rapid combustion of a pyrotechnic charge, producing gases which inflate the corresponding airbag. Modern production vehicles do not use multiple inflation rates in deploying the airbags due to the complexity and cost of the prior art systems. Consequently, the rate in which the airbags are deployed is not controlled to optimize the performance of the airbag system to the magnitude of a given impact. As the speed with which the vehicle occupants move relative to the vehicle during a collision depends upon the speed of the collision, optimization of the rate of deployment can be utilized to tailor the deployment of an airbag to minimize risk of injury from contact between the vehicle occupant and the vehicle as well as between the vehicle occupant and the airbag.

SUMMARY OF THE INVENTION

It is therefore one object of the present invention to provide an airbag system which can vary the rate of deployment of an airbag according to the magnitude and severity of an impact.

It is a more specific object of the present invention to vary the rate of airbag inflation through the use of an inflator having two independent squibs.

It is another aspect of the preset invention to provide an airbag system having an improved ability to deploy an airbag where a fault in a squib circuit has been detected.

To achieve these objects, a method for controlling an airbag system is provided. The airbag system includes an airbag module which may be deployed at different rates to optimize performance of the airbag module to a given impact. The airbag system includes a control module, an impact sensor, a seatbelt restraint sensor and an airbag module. The airbag module includes an inflator having two independent squibs, a first one of the squibs being coupled to a first charge and a second one of the squibs being coupled to a second charge. The method monitors various vehicle dynamics and controls the generation of first and second squib pulses which cause the deployment of the first and second charges so as to optimize the rate at which the airbag is deployed for an impact of a given magnitude. The method also monitors the integrity of each squib circuit and when a fault in a squib circuit is detected, the deployment algorithm is modified to ensure that the airbag will deploy.

Additional advantages and features of the present invention will become apparent from the subsequent description and the appended claims, taken in conjunction with the accompanying drawings.

DETAILED DESCRIPTION OF THE PREFERRED EMBODIMENT

Figure 1A:
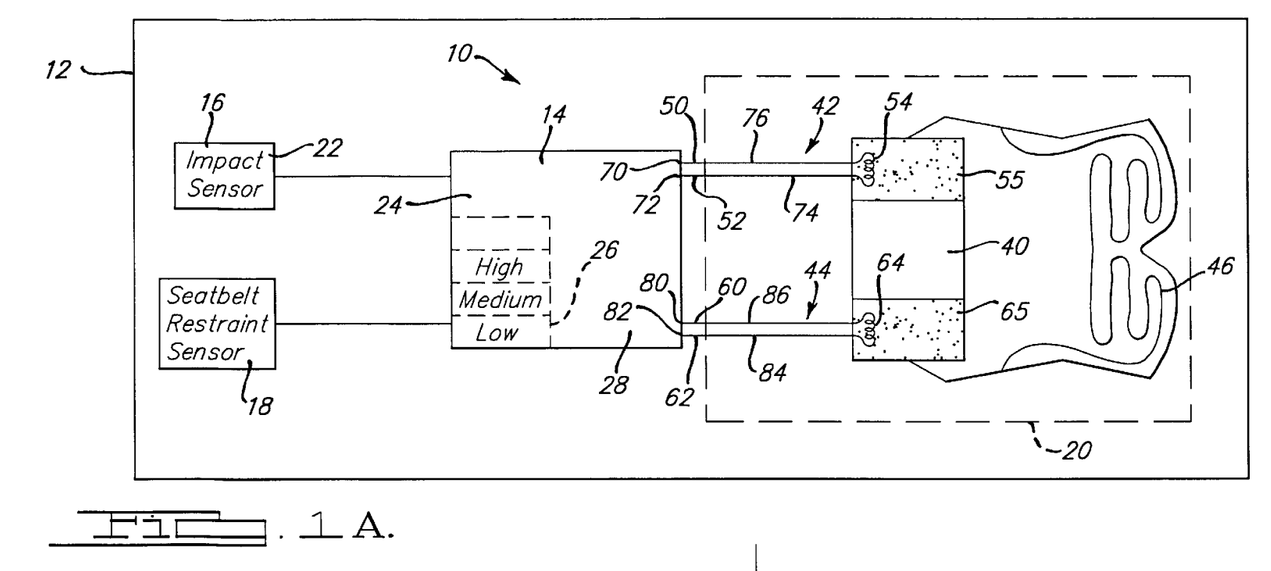
FIG. 1A is a schematic diagram of an airbag system according to the preferred embodiment of the present invention.

With reference to FIG. 1A of the drawings, an airbag system according to a presently preferred embodiment of the present invention is schematically indicated by reference numeral 10 and is shown operatively associated with vehicle 12. Airbag system 10 is shown to include a control module 14, an impact sensor 16, a seatbelt restraint sensor 18 and an airbag module 20. Impact sensor 16 is operable for generating an impact signal in response to a collision between vehicle 12 and another object. Impact sensor 16 may be an accelerometer 22 and preferably produces an impact signal which continuously varies in response to the magnitude of the collision. Control module 14 includes a microprocessor 24, memory 26, and a timer 28. Control module 14 receives the impact signal from impact sensor 16 as well as other signals relating to the vehicle impact dynamics in order to determine the severity of a collision. The other impact dynamics could include, for example, a flag generated by the seatbelt restraint sensor 18 indicating that the vehicle occupant is restrained by a seatbelt.

Airbag module 20 includes an inflator 40, first and second squib circuits 42 and 44, respectively, and an airbag 46. First squib circuit 42 includes a negative circuit element 50, a positive circuit element 52 and a first squib 54 which is coupled to inflator 40 proximate a first charge 55. Negative and positive circuit elements 50 and 52 electrically couple first squib 54 to control module 14. Second squib circuit 44 includes a negative circuit element 60, a positive circuit element 62 and a second squib 64 which is coupled to inflator 40 proximate a second charge 65. Negative and positive circuit elements 60 and 62 electrically couple second squib 64 to control module 14.

Figure 1B:
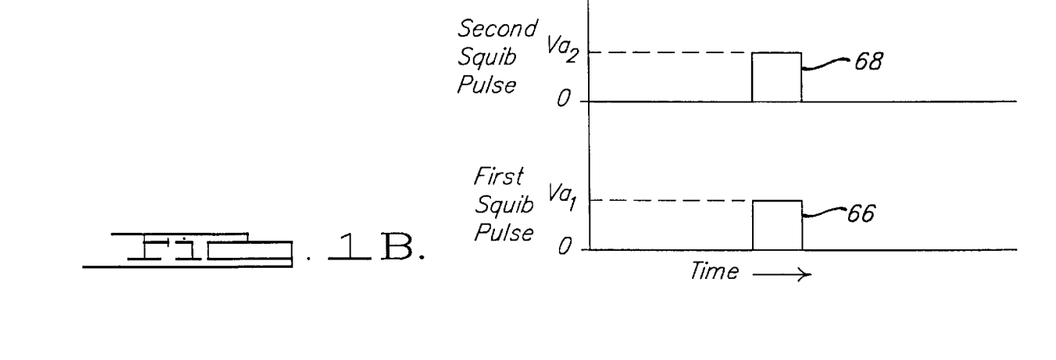
FIG. 1B is a schematic diagram of the electrical pulses generated by the control module to initiate combustion of the first and second charges in the inflator.

When it becomes necessary to deploy airbag 46, control module 14 generates a series of pulses according to the method of the present invention discussed in detail, below. First and second squib pulses 66 and 68 as shown in FIG. 1B are representative of the type of electrical signals produced by control module 14. Generation of first squib pulse 66 causes first squib 54 to heat and ignite first charge 55. Combustion of first charge 55 produces a first volume of gas which is directed into airbag 46 causing it to inflate at a first rate. Generation of second squib pulse 68 causes second squib 64 to heat and ignite second charge 65. Combustion of second charge 65 produces a second volume of gas which is directed into airbag 46 causing it to inflate at a second rate. As one skilled in the art may appreciate, the generation of first and second squib pulses 66 and 68 may be controlled by control module 14 so as to optimize for a given collision the timing of the airbag inflation, as well as the rate at which the airbag 46 is inflated. As one skilled in the art may also appreciate, first and second charges 55 and 65 may be sized differently (i.e., non-equally) to further optimize the performance of airbag module 20.

Figure 2:
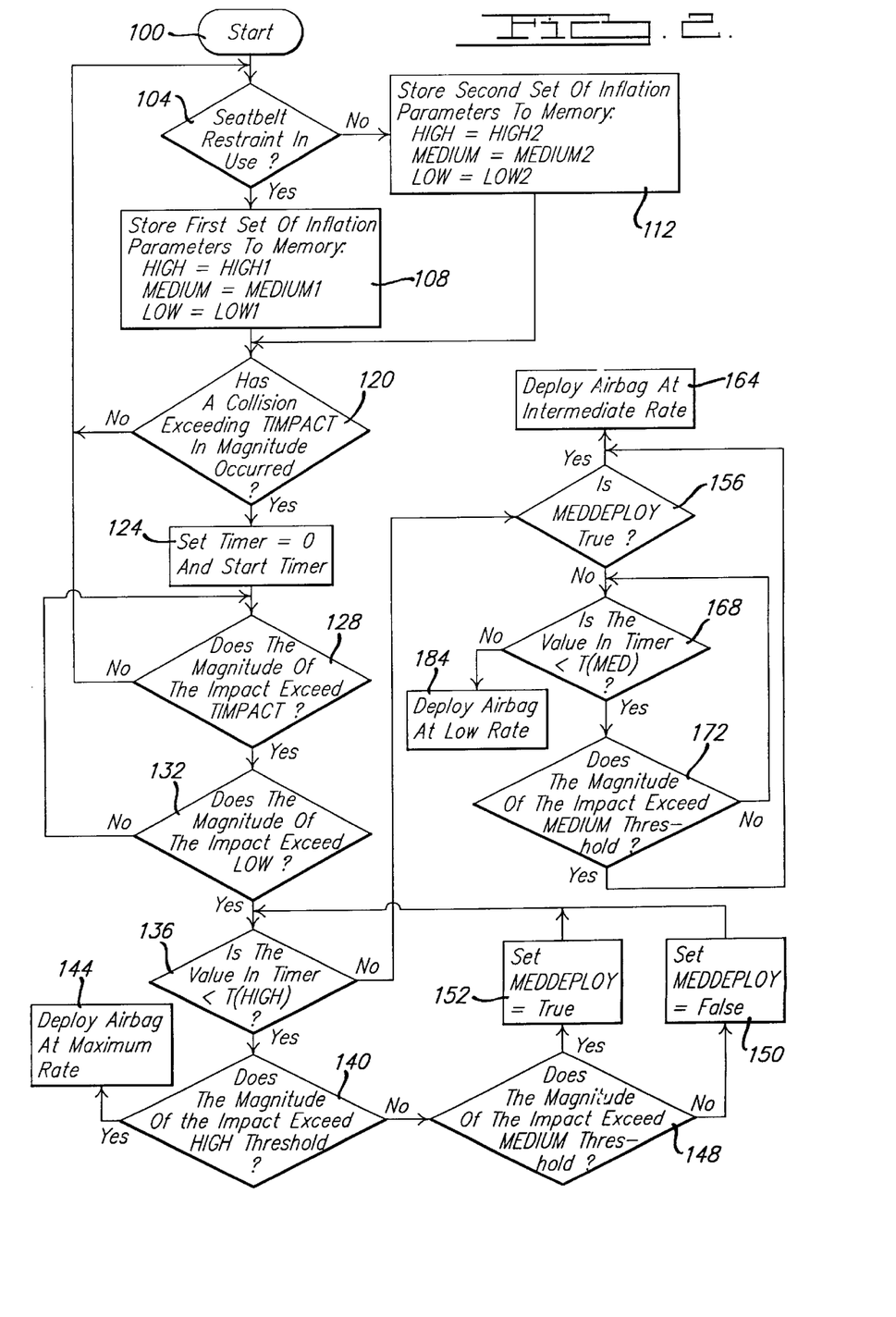
FIG. 2 is a flowchart detailing the airbag deployment method of the present invention.

Referring now to FIG. 2, the method for controlling the deployment of airbag 46 will be discussed. The methodology enters the routine at block 100 and progresses to decision block 104 where the methodology determines whether the vehicle occupant is using their seatbelt restraint. If the seatbelt restraint is being used, the methodology proceeds to block 108 where a first set of inflation parameters is stored in memory 26 for subsequent use. This first set of inflation parameters includes predetermined threshold levels for judging the magnitude of the collision which may also include parameters relating to the duration of the impact. For the purposes of this example, it will be assumed that there are three predetermined impact severity levels associated with the first set of inflation parameters and that these parameters are set to values HIGH1, MEDIUM1 and LOW1, respectively. The values of HIGH1, MEDIUM1 and LOW1 are stored in memory 26 in registers HIGH, MEDIUM and LOW, respectively. The methodology then proceeds to decision block 120. If the seatbelt restraint is not being used, the methodology proceeds to block 112 where a second set of inflation parameters is stored in memory 26 for subsequent use. The second set of inflation parameters is similar in content to the first set of inflation parameters except that the magnitude of the various parameters reflects desired differences resulting from differences between restrained and unrestrained vehicle occupants. As with the first set of inflation parameters, the second set of inflation parameters will also be assumed to have three predetermined impact severity levels. These severity levels are set to values of HIGH2, MEDIUM2 and LOW2, respectively. The values of HIGH2, MEDIUM2 and LOW2 are stored in memory 26 in registers HIGH, MEDIUM and LOW, respectively. The methodology then proceeds to decision block 120.

At decision block 120, the methodology determines whether an impact exceeding a predetermined level, TIMPACT, has occurred. The magnitude of TIMPACT typically corresponds to a change in acceleration of approximately 2–3 g. If such an impact has not been detected, the methodology returns to decision block 104. If an impact exceeding TIMPACT has occurred, the methodology proceeds to block 124 where timer 28 is reset to zero (0) and started. The methodology then proceeds to decision block 128.

At decision block 128, the methodology again determines whether the magnitude of the impact still exceeds TIMPACT. If the magnitude of the impact is equal to or less than TIMPACT, the methodology will return to decision block 104. If the magnitude of the impact still exceeds TIMPACT, the methodology will proceed to decision block 132 where the magnitude of the impact is compared to the LOW threshold (i.e., LOW1 or LOW2) stored in memory 26. If the magnitude of the collision does not exceed the LOW threshold, the methodology returns to decision block 128. The methodology will continue in the loop between decision blocks 128 and 132 until such time that the magnitude of the impact diminishes below TIMPACT or exceeds the LOW threshold. If the magnitude of the impact exceeds the LOW threshold, the methodology proceeds to decision block 136.

In decision block 136, the methodology next determines whether the value in timer 28 exceeds $T_{(HIGH)}$. In the example described, $T_{(HIGH)}$ is the time in which an unrestrained 50$^{th}$ percentile male dummy moves five inches forward relative to vehicle 12 in a 30 mile-per-hour flat frontal impact. It will be understood, however, that the criteria on which $T_{(HIGH)}$ is based may differ depending upon a diverse number of variables, including the design of the vehicle, airbag deployment rate and other design criteria unique to a given application. Accordingly, the above mentioned criteria for establishing $T_{(HIGH)}$ is provided for purposes of illustration and not meant to be limiting in any manner. Referring back to decision block 136, if the value in timer 28 is less than $T_{(HIGH)}$, the methodology proceeds to decision block 140. If the value in timer 28 is greater than $T_{(HIGH)}$, the methodology proceeds to decision block 156.

In decision block 140, the methodology next compares the magnitude of the impact to the HIGH threshold. If the magnitude of the impact exceeds the HIGH threshold, the methodology proceeds to block 144 wherein control module 14 generates first and second squib pulses 66 and 68 simultaneously, or at least in immediate succession, so as to inflate airbag 46 as quickly as possible. Inflation of airbag 46 at this maximum rate is desirable due to the speed of the vehicle occupant relative to vehicle 12. The potential to cause injury to the vehicle occupant by inflating airbag 46 at this maximum rate is substantially reduced due to the use of $T_{(HIGH)}$. The methodology prevents deployment of airbag 46 at the maximum rate if the value in timer 28 equals or exceeds $T_{(HIGH)}$. This minimizes the risk that the vehicle occupant will be too far forward relative to vehicle 12 when airbag 46 is deployed and thereby substantially reduces the risk that the vehicle occupant will be injured by the deploying airbag 46.

If the magnitude of the impact does not exceed the HIGH threshold, the methodology proceeds to decision block 148 where the magnitude is compared to the MEDIUM threshold. If the magnitude of the impact does not exceed the MEDIUM threshold, the methodology proceeds to block 150 where a flag, MEDDEPLOY, is set to "false" (i.e., MEDDEPLOY=0). The methodology then returns to decision block 136. If the magnitude of the impact exceeds the MEDIUM threshold, the methodology proceeds to block 152 where the MEDDEPLOY flag is set to "true" (i.e., MEDDEPLOY=1). The methodology then returns to decision block 136. The methodology continues in the loop between decision block 136 and blocks 150 and 152 until the magnitude of the impact exceeds the HIGH threshold or the value in timer 28 equals or exceeds $T_{(HIGH)}$.

Operation in this loop, therefore, permits airbag 46 to be deployed at any time prior to the time at which the vehicle occupant has moved too far forward relative to vehicle 12. As such, the methodology guards against the risk that airbag 46 will be inflated at a less-than-optimal rate for impacts exceeding the HIGH impact magnitude threshold.

At decision block 156, the methodology evaluates the MEDDEPLOY flag. If the flag is set to true, the methodology proceeds to block 164 wherein control module 14 generates first squib pulse 66 so as to initiate the combustion of first charge 55 to begin the inflation of airbag 46. After a predetermined time interval, control module 14 generates second squib pulse 68 so as to initiate the combustion of second charge 65 to further inflate airbag 46. The combustion of first and second charges 55 and 65, respectively, in this manner causes airbag 46 to inflate at an intermediate rate. Testing has shown that the predetermined time interval between the initiation of first and second charges 55 and 65, respectively, may range between 10 to 30 seconds. However, the magnitude of the predetermined time interval between the initiation of first and second charges 55 and 65, respectively, varies from application to application based upon a number of criteria, including the specific design of the air bag and the vehicle in which it is used. Referring back to decision block 156, if the MEDDEPLOY flag is set to false, the methodology proceeds to decision block 168.

At decision block 168, the methodology compares the value in timer 28 to $T_{(MED)}$. In the example discussed, $T_{(MED)}$ is similar to $T_{(HIGH)}$ in that it is obtained from empirical testing and is representative of the position of the vehicle occupant relative to vehicle 12. $T_{(MED)}$ may therefore be the time in which an unrestrained $50^{th}$ percentile male dummy moves five inches forward relative to vehicle 12 in a 14 mile-per-hour flat frontal impact. It will be understood, however, that the criteria on which $T_{(MED)}$ is based may differ depending upon a diverse number of variables, including the design of the vehicle, airbag deployment rate and other design criteria unique to a given application. Accordingly, the above mentioned criteria for establishing $T_{(MED)}$ is provided for purposes of illustration and not meant to be limiting in any manner. Referring back to decision block 168, if the value in timer 28 is less than $T_{(MED)}$, the methodology proceeds to decision block 172 where the magnitude of the impact is compared to the MEDIUM threshold. If the magnitude exceeds the MEDIUM threshold, the methodology proceeds to block 164 and airbag 46 is deployed at the intermediate rate as discussed above. If the magnitude does not exceed the MEDIUM threshold, the methodology returns to decision block 168. The methodology continues in the loop between decision blocks 168 and 172 until such time that the magnitude of the impact exceeds the MEDIUM threshold or the value in timer 28 equals or exceeds $T_{(MED)}$. If the value in timer 28 equals or exceeds $T_{(MED)}$, the methodology proceeds to block 184 wherein control module 14 generates first squib pulse 66 so as to initiate the combustion of first charge 55 and inflate airbag 46 at a low rate.

Figure 3:
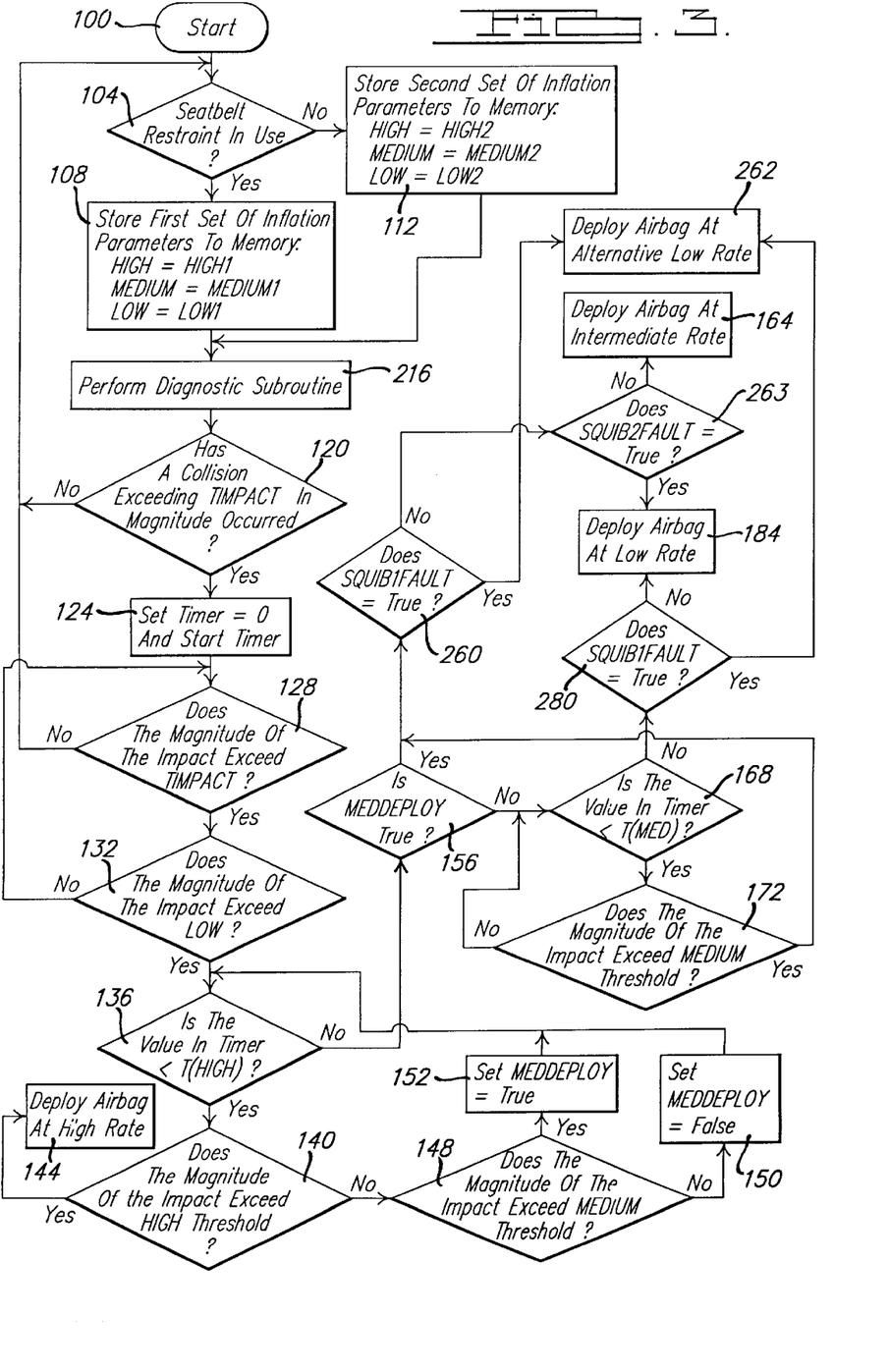
FIG. 3 is a flowchart detailing the airbag deployment method of an alternate embodiment of the present invention.

Referring now to FIG. 3, the methodology for controlling the deployment of airbag module according to an alternate embodiment of the present invention will now be discussed. Note that as significant portions of this methodology are identical to the methodology described in conjunction with FIG. 2, only those portions which differ will be discussed.

One such difference is the use of a diagnostic sub-routine to determine whether the first and second squib circuits 42 and 44 are functional. After determining whether the vehicle occupant is using their seatbelt restraint and selecting the corresponding set of inflation parameters, the methodology proceeds to block 216 where a diagnostic sub-routine is performed. The diagnostic sub-routine is shown in detail in FIG. 4.

Figure 4:
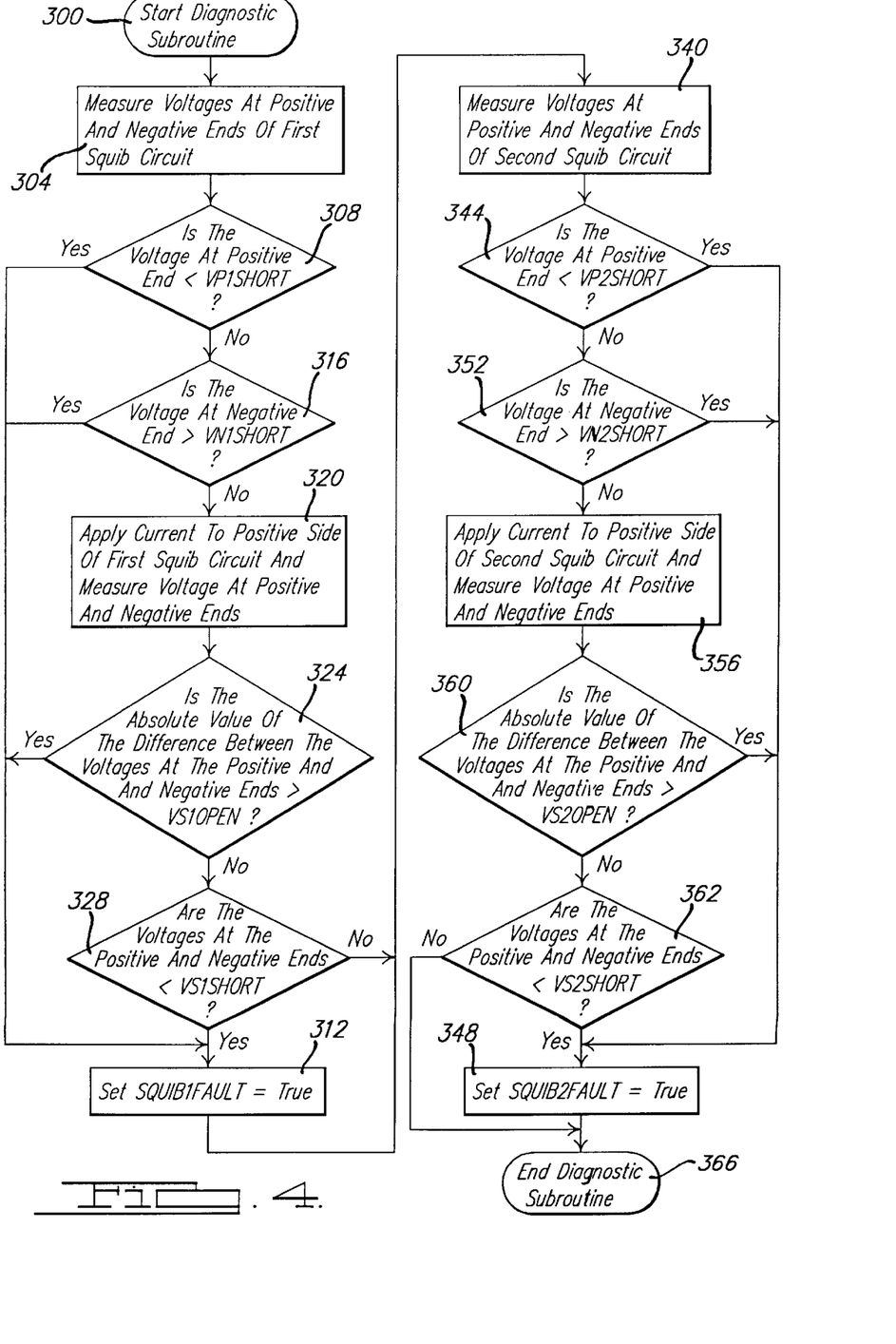
FIG. 4 is a flowchart for a diagnostic subroutine for detecting squib circuit faults.

Referring now to FIG. 4, the methodology enters the diagnostic sub-routine at block 300 and progresses to block 304. At block 304, the control module 14 measures the voltage present at the negative and positive terminals 70 and 72, respectively. The methodology then proceeds to decision block 308 where the voltage measured at positive terminal 72 is compared with a predetermined value, VP1SHORT.

If the voltage measured at positive terminal 72 is less than VP1SHORT, positive circuit element 52 may have been shorted to ground. The methodology then proceeds to block 312 where the SQUIB1FAULT flag is set. The methodology then advances to block 340. Returning to decision block 308, if the voltage measured at positive terminal 72 is not less than VP1SHORT, indicating that positive circuit element 52 has not shorted to ground, the methodology proceeds to decision block 316 where the voltage measured at negative terminal 70 is compared with a predetermined value, VN1SHORT.

If the voltage measured at negative terminal 70 is greater than VN1SHORT, negative circuit element 50 may have been shorted to the vehicle power supply (not shown). The methodology then proceeds to block 312. If the voltage measured at negative terminal 70 is not greater than VN1SHORT, indicating that negative circuit element 50 has not shorted to the vehicle power supply, the methodology proceeds to block 320.

In block 320, control module 14 applies a predetermined current to positive circuit element 52 and measures the voltage at negative and positive terminals 70 and 72, respectively. The methodology then proceeds to decision block 324.

In decision block 324, the methodology will compare the measured voltage at positive terminal 72 to the measured voltage at negative terminal 70. If the absolute value of the voltage difference between the voltage measured at negative and positive terminals 70 and 72, respectively, is greater than a predetermined value, VS1OPEN, first squib circuit 42 is presumed to be electrically open (i.e., will not conduct electricity) and the methodology will proceed to block 312. If the absolute value of the voltage difference at negative and positive terminal 70 and 72, respectively, is not greater than VS1OPEN, the methodology proceeds to decision block 328.

In decision block 328, the methodology compares the absolute value of the voltage difference between the voltage measured at negative and positive terminals 70 and 72, respectively, to a predetermined value, VS1SHORT. If the absolute value of the voltage difference between the voltage measured at negative and positive terminals 70 and 72, respectively, is less than VS1SHORT, first squib circuit 42 is presumed to have electrically shorted and the methodology proceeds to block 312. If the absolute value of the voltage difference between the voltage measured at negative and positive terminals 70 and 72, respectively, is not less than VS1SHORT, first squib circuit 42 is presumed to be operational and the methodology proceeds to block 340.

At block 340, the control module 14 measures the voltage present at the negative and positive terminals 80 and 82, respectively. The methodology then proceeds to decision block 344 where the voltage measured at positive terminal 82 is compared with a predetermined value, VP2SHORT.

If the voltage measured at positive terminal 82 is less than VP2SHORT, positive circuit element 62 may have been shorted to ground. The methodology then proceeds to block 348 where the SQUIB2FAULT flag is set. The methodology then advances to block 366. Returning to decision block 344, if the voltage measured at positive terminal 82 is not less than VP2SHORT, indicating that positive circuit element 62 has not shorted to ground, the methodology proceeds to decision block 352 where the voltage measured at negative terminal 80 is compared with a predetermined value, VN2SHORT.

If the voltage measured at negative terminal 80 is greater than VN2SHORT, negative circuit element 60 may have been shorted to the vehicle power supply. The methodology then proceeds to block 348. If the voltage measured at negative terminal 80 is not greater than VN2SHORT, indicating that negative circuit element 60 has not been shorted to the vehicle power supply, the methodology proceeds to block 356.

In block 356, control module 14 applies a predetermined current to positive circuit element 62 and measures the voltage at negative and positive terminals 80 and 82, respectively. The methodology then proceeds to decision block 360.

In decision block 360, the methodology will compare the measured voltage at positive terminal 82 to the measured voltage at negative terminal 80. If the absolute value of the voltage difference between the voltage measured at negative and positive terminals 80 and 82, respectively, is greater than a predetermined value, VS2OPEN, second squib circuit 44 is presumed to be electrically open (i.e., will not conduct electricity) and the methodology will proceed to block 348. If the absolute value of the voltage difference at negative and positive terminal 80 and 82, respectively, is not greater than VS2OPEN, the methodology proceeds to decision block 362.

In decision block 362, the methodology compares the absolute value of the voltage difference between the voltage measured at negative and positive terminals 80 and 82, respectively, to a predetermined value, VS2SHORT. If the absolute value of the voltage difference between the voltage measured at negative and positive terminals 80 and 82, respectively, is less than VS2SHORT, second squib circuit 44 is presumed to have electrically shorted and the methodology proceeds to block 348. If the absolute value of the voltage difference between the voltage measured at negative and positive terminals 80 and 82, respectively, is not less than VS2SHORT, second squib circuit 44 is presumed to be operational and the methodology proceeds to bubble 366 where the diagnostic subroutine terminates. The methodology then proceeds to decision block 120 as shown in FIG. 3 where the magnitude of the impact is compared to a predetermined value.

Another difference with the method of the alternate embodiment concerns the generation of the first and second squib pulses 66 and 68 to inflate airbag 46 at either the intermediate or low rates. With regard to the methodology subsequent to the decision to deploy airbag 46 at the intermediate rate (i.e., MEDDEPLOY=true at decision block 156, or the magnitude of the impact exceeds the MEDIUM threshold at decision block 172), the methodology first inquires at decision block 260 as to the status of the SQUIB1FAULT flag. If the SQUIB1FAULT flag has been set to true indicating that first squib circuit 42 is not operational, the methodology proceeds to block 262 where control module 14 generates second squib pulse 68 to initiate the deployment of airbag 46 at the alternative low rate. Alternative low rate may have a rate which is slightly greater or lesser than low rate depending on the difference in the sizes of first and second charges 55 and 65, respectively. While deployment of airbag 46 at the alternative low rate is not optimal, it nonetheless ensures that airbag 46 will be deployed and as such, provides the vehicle occupant with a measure of restraint which may not have been available if the methodology had attempted to deploy airbag 46 at the intermediate rate.

Returning to decision block 260, if the SQUIB1FAULT flag has not been set to true, the methodology will proceed to decision block 263 where the status of the SQUIB2FAULT flag is checked. If the SQUIB2FAULT is set to true indicating that second squib circuit 44 is not operational, the methodology proceeds to block 184 and deploys the airbag at the low rate. While deployment of airbag 46 at the low rate is not optimal, it nonetheless ensures the deployment of airbag 46 and provides the vehicle occupant with a measure of restraint which may not have been available if the methodology had attempted to deploy airbag 46 at the intermediate rate.

If the SQUIB2FAULT flag has not been set to true, both first and second squibs 54 and 64, respectively, are presumed to be operational and the methodology proceeds to block 164 where airbag 46 is caused to deploy at the intermediate rate as previously explained.

With regard to a decision to deploy airbag 46 at the low rate (i.e., the value of timer 28 is not less than $T_{(MED)}$ in block 168), the methodology first inquires at decision block 280 as to whether the SQUIB1FAULT flag has been set to indicate that first squib circuit 42 has a fault. If the SQUIB1FAULT flag has been set, the methodology proceeds to block 262 and control module generates second squib pulse 68 to initiate the deployment of airbag 46 at the alternative low rate. While deployment of airbag 46 at the alternative low rate is not optimal, it nonetheless ensures the deployment of airbag 46 and provides the vehicle occupant with a measure of restraint which may not have been available if the methodology had attempted to deploy airbag 46 at the low rate. If the SQUIB1FAULT has not been set to true, the methodology proceeds to block 184 where airbag 46 is caused to deploy at the low rate as previously explained.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. In a vehicle having an impact sensor, a seatbelt restraint sensor, an airbag module and a control module having a memory and a timer, said impact sensor operable for generating an impact signal in response to a collision involving said vehicle, said seatbelt restraint sensor operable for generating a restraint signal indicating that a vehicle occupant is restrained by a seatbelt restraint, said airbag module including an inflator having first and second charges, first and second squib circuits and an airbag, said first squib circuit including a first squib coupled to said first charge and operable for igniting said first charge, said second squib circuit including a second squib coupled to said second charge and operable for igniting said second charge, said control module coupled to said impact sensor, said seatbelt restraint sensor and said first and second squib circuits, said control module receiving said impact signal and said restraint signal, said control module operable for selectively generating first and second squib pulses to cause said first and second squibs, respectively, to ignite said first and second charges, respectively, a method for controlling deployment of said airbag comprising the steps of:

determining whether a collision having an impact magnitude exceeding a predetermined initial impact magnitude value has occurred;

setting said timer to zero and starting said timer;

determining whether said impact magnitude continues to exceed said initial impact magnitude;

determining whether said impact magnitude exceeds a predetermined LOW impact magnitude value if said impact magnitude continues to exceed said initial impact magnitude;

determining whether a value in said timer is less than predetermined high timer value if said impact magnitude exceeds said LOW impact magnitude value;

determining whether said impact magnitude exceeds a HIGH impact magnitude value if said timer value does not exceed said high timer value;

generating said first and second squib pulses if said impact magnitude exceeds said HIGH impact magnitude value and said timer value is less than said high timer value, said first and second squib pulses thereby causing said first and second squibs, respectively, to ignite said first and second charges, respectively, and inflating said airbag at a predetermined high inflation rate; and generating at least one of said first and second squib pulses if said impact magnitude exceeds said LOW impact magnitude value, said at least one of said first and second squib pulses thereby causing at least one of said first and second charges to ignite and inflate said airbag at an inflation rate less than said predetermined high inflation rate.

2. The method of claim 1 further comprising the steps of:

determining whether said vehicle occupant is restrained by said seatbelt restraint;

selecting a first set of inflation parameters if said vehicle occupant is restrained by said seatbelt restraint, said first set of inflation parameters having a plurality of first predetermined impact magnitude thresholds;

storing said first set of inflation parameters into said memory if said vehicle occupant is restrained by said seatbelt restraint;

otherwise, selecting a second set of inflation parameters if said vehicle occupant is not restrained by said seatbelt restraint, said second set of inflation parameters having a plurality of second predetermined impact magnitude thresholds; and storing said second set of inflation parameters into said memory if said vehicle occupant is not restrained by said seatbelt restraint.

3. The method of claim 1 wherein the step of generating at least one of said first and second squib pulses includes the steps of:

determining whether said impact magnitude exceeds a MEDIUM impact magnitude value;

determining whether a value in said timer is less than a predetermined intermediate timer value if said impact magnitude does not exceed said MEDIUM impact magnitude value;

generating said first squib pulse if said impact magnitude exceeds said LOW impact magnitude value and said value in said timer is not less than said predetermined intermediate timer value to thereby cause said first charge to ignite and inflate said airbag at a predetermined low inflation rate;

otherwise, generating said first squib pulse to ignite said first charge if said impact magnitude exceeds said MEDIUM impact magnitude value; and generating said second squib pulse after a predetermined amount of time to ignite said second charge to thereby cause said airbag to inflate at a predetermined intermediate inflation rate.

4. The method of claim 3 wherein the step of determining whether said impact magnitude exceeds said MEDIUM impact magnitude value and the step of determining whether said value in said timer is less than said predetermined intermediate timer value are repeated if said impact magnitude does not exceed said MEDIUM impact magnitude value and said value in said timer is less than said predetermined intermediate timer value.

5. The method of claim 1 wherein the step of determining whether said value in said timer is less than said predetermined high timer value and the step of determining whether said impact magnitude exceeds said HIGH impact magnitude value are repeated if said impact magnitude does not exceed said HIGH impact magnitude value and said value in said timer is less than said predetermined high timer value.

6. The method of claim 1 further comprising the step of performing a diagnostic subroutine on said first and second squib circuits.

7. The method of claim 6 wherein the step of performing a diagnostic subroutine includes the steps of:

determining if said first squib circuit is operational;

setting a first squib fault flag if said first squib circuit is not operational;

determining if said second squib circuit is operational; and setting a second squib fault flag if said second squib circuit not operational.

8. The method of claim 6 wherein the step of generating at least one of said first and second squib pulses includes the steps of:

determining if said impact magnitude exceeds a MEDIUM impact magnitude;

determining if said value in said timer is less than a predetermined intermediate timer value;

determining if said first squib circuit is operational;

determining if said second squib circuit is operational;

generating said first squib pulse if said impact magnitude exceeds said MEDIUM impact magnitude, said first squib circuit is operational and said second squib circuit is not operational to thereby cause said airbag to inflate at a predetermined low inflation rate;

otherwise, generating said second squib pulse if said impact magnitude exceeds said MEDIUM impact magnitude and said first squib circuit is not operational to thereby cause said airbag to inflate at a predetermined alternative low inflation rate;

otherwise, generating said first squib pulse to ignite said first charge if said impact magnitude exceeds said MEDIUM impact magnitude and said value in said timer is less than said predetermined intermediate timer value; and generating said second squib pulse after a predetermined amount of time to ignite said second charge to thereby cause said airbag to inflate at a predetermined intermediate inflation rate.

9. The method of claim 8 further comprising the steps of:

generating said first squib pulse if said impact magnitude exceeds said LOW impact magnitude, said value in said timer is not less than said intermediate timer value and said first squib circuit is operational; and otherwise, generating said second squib pulse if said impact magnitude exceeds said LOW impact magnitude, said value in said timer is not less than said intermediate timer value and said first squib circuit is not operational.

10. The method of claim 6 wherein said diagnostic subroutine includes the steps of:

determining if a first portion of said first squib circuit is shorted to a ground;

determining if a second portion of said first squib circuit is shorted to a vehicle power supply;

determining if said first squib circuit is open; and determining if said first squib circuit is shorted.

11. The method of claim 6 wherein said diagnostic subroutine includes the steps of:

determining if a first portion of said second squib circuit is shorted to a ground;

determining if a second portion of said second squib circuit is shorted to a vehicle power supply;

determining if said second squib circuit is open; and determining if said second squib circuit is shorted.

12. In a vehicle having an impact sensor, a seatbelt restraint sensor, an airbag module and a control module having a memory and a timer, said impact sensor operable for generating an impact signal in response to a collision involving said vehicle, said seatbelt restraint sensor operable for generating a restraint signal indicating that a vehicle occupant is restrained by a seatbelt restraint, said airbag module including an inflator having first and second charges, first and second squib circuits and an airbag, said first squib circuit including a first squib coupled to said first charge and operable for igniting said first charge, said second squib circuit including a second squib coupled to said second charge and operable for igniting said second charge, said control module coupled to said impact sensor, said seatbelt restraint sensor and said first and second squib circuits, said control module receiving said impact signal and said restraint signal, said control module operable for selectively generating first and second squib pulses to cause said first and second squibs, respectively, to ignite said first and second charges, respectively, a method for controlling deployment of said airbag comprising the steps of:

determining whether said vehicle occupant is restrained by said seatbelt restraint;

selecting a first set of inflation parameters if said vehicle occupant is restrained by said seatbelt restraint, said first set of inflation parameters having a plurality of first predetermined impact magnitude thresholds;

storing said first set of inflation parameters into said memory if said vehicle occupant is restrained by said seatbelt restraint;

selecting a second set of inflation parameters if said vehicle occupant is not restrained by said seatbelt restraint, said second set of inflation parameters having a plurality of second predetermined impact magnitude thresholds;

storing said second set of inflation parameters into said memory if said vehicle occupant is not restrained by said seatbelt restraint;

determining whether a collision having an impact magnitude exceeding a predetermined initial impact magnitude value has occurred;

setting said timer to zero and starting said timer;

determining whether said impact magnitude continues to exceed said initial impact magnitude;

repeating the previous eight steps if said impact magnitude does not continue to exceed said initial impact magnitude;

determining whether said impact magnitude exceeds a predetermined LOW impact magnitude value if said impact magnitude continues to exceed said initial impact magnitude;

repeating the above two steps if said impact magnitude does not exceed said LOW impact magnitude value;

determining whether a value of said timer is less than a predetermined high timer value if said impact magnitude exceeds said LOW impact magnitude value;

determining whether said impact magnitude exceeds a HIGH impact magnitude value if said timer value does not exceed said high timer value;

repeating the previous two steps if said impact magnitude does not exceed said HIGH impact magnitude value and said value in said timer is less than said predetermined high timer value;

generating said first and second squib pulses if said impact magnitude exceeds said HIGH impact magnitude value and said timer value is less than said high timer value, said first and second squib pulses thereby causing said first and second squibs, respectively, to ignite said first and second charges, respectively, and inflating said airbag at a predetermined high inflation rate; and generating at least one of said first and second squib pulses if said impact magnitude exceeds said LOW impact magnitude value, said at least one of said first and second squib pulses thereby causing at least one of said first and second charges to ignite and inflate said airbag at an inflation rate less than said predetermined high inflation rate.

13. The method of claim 12 wherein the step of generating at least one of said first and second squib pulses includes the steps of:

determining whether said impact magnitude exceeds a MEDIUM impact magnitude value;

determining whether a value in said timer is less than a predetermined intermediate timer value if said impact magnitude does not exceed said MEDIUM impact magnitude value;

generating said first squib pulse if said impact magnitude exceeds said LOW impact magnitude value and said value in said timer is not less than said predetermined intermediate timer value to thereby cause said first charge to ignite and inflate said airbag at a predetermined low inflation rate;

otherwise, generating said first squib pulse to ignite said first charge if said impact magnitude exceeds said MEDIUM impact magnitude value and said value in said timer is less than said predetermined intermediate timer value; and generating said second squib pulse after a predetermined amount of time to ignite said second charge to thereby cause said airbag to inflate at a predetermined intermediate inflation rate.

14. The method of claim 13 wherein the step of determining whether said impact magnitude exceeds said MEDIUM impact magnitude value and the step of determining whether said value in said timer is less than said predetermined intermediate timer value are repeated if said impact magnitude does not exceed said MEDIUM impact magnitude value and said value in said timer is less than said predetermined intermediate timer value.

15. The method of claim 12 further comprising the step of performing a diagnostic subroutine on said first and second squib circuits.

16. The method of claim 15 wherein the step of performing a diagnostic subroutine includes the steps of:

determining if said first squib circuit is operational;

setting a first squib fault flag if said first squib circuit is not operational;

determining if said second squib circuit is operational; and setting a second squib fault flag if said second squib circuit not operational.

17. The method of claim 15 wherein the step of generating at least one of aid first and second squib pulses includes the steps of:

determining if said impact magnitude exceeds a MEDIUM impact magnitude;

determining if said value in said timer is less than a predetermined intermediate timer value;

determining if said first squib circuit is operational;

determining if said second squib circuit is operational;

generating said first squib pulse if said impact magnitude exceeds said MEDIUM impact magnitude, said first squib circuit is operational and said second squib circuit is not operational to thereby cause said airbag to inflate at a predetermined low inflation rate;

otherwise, generating said second squib pulse if said impact magnitude exceeds said MEDIUM impact magnitude and said first squib circuit is not operational to thereby cause said airbag to inflate at a predetermined alternative low inflation rate;

otherwise, generating said first squib pulse to ignite said first charge if said impact magnitude exceeds said MEDIUM impact magnitude and said value in said timer is less than said predetermined intermediate timer value; and generating said second squib pulse after a predetermined amount of time to ignite said second charge to thereby cause said airbag to inflate at a predetermined intermediate inflation rate.

18. The method of claim 17 further comprising the steps of:

generating said first squib pulse if said impact magnitude exceeds said LOW impact magnitude, said value in said timer is not less than said intermediate timer value and said first squib circuit is operational; and otherwise, generating said second squib pulse if said impact magnitude exceeds said LOW impact magnitude, said value in said timer is not less than said intermediate timer value and said first squib circuit is not operational.

19. The method of claim 15 wherein said diagnostic subroutine includes the steps of:

determining if a first portion of said first squib circuit is shorted to a ground;

determining if a second portion of said first squib circuit is shorted to a vehicle power supply;

determining if said first squib circuit is open; and determining if said first squib circuit is shorted.

20. The method of claim 15 wherein said diagnostic subroutine includes the steps of:

determining if a first portion of said second squib circuit is shorted to a ground;

determining if a second portion of said second squib circuit is shorted to a vehicle power supply;

determining if said second squib circuit is open; and determining if said second squib circuit is shorted.

* * * * *